US012789590B2

(12) United States Patent
Karl

(10) Patent No.: US 12,789,590 B2
(45) Date of Patent: Nov. 10, 2026

(54) HEAT PRODUCING UNIT FOR A MOTOR VEHICLE

(71) Applicant: VALEO SYSTEMES THERMIQUES, La Verriere (FR)

(72) Inventor: Stefan Karl, La Verriere (FR)

(73) Assignee: Valeo Electrification

( * ) Notice: Subject to any disclaimer, the term of this patent is extended or adjusted under 35 U.S.C. 154(b) by 61 days.

(21) Appl. No.: 18/578,822

(22) PCT Filed: Jul. 1, 2022

(86) PCT No.: PCT/EP2022/068354
§ 371 (c)(1),
(2) Date: Jan. 12, 2024

(87) PCT Pub. No.: WO2023/285173
PCT Pub. Date: Jan. 19, 2023

(65) Prior Publication Data
US 2024/0336116 A1 Oct. 10, 2024

(30) Foreign Application Priority Data
Jul. 12, 2021 (FR) ...................................... 2107533

(51) Int. Cl.
*B60H 1/32* (2006.01)
*B60H 1/00* (2006.01)

(52) U.S. Cl.
CPC ..... *B60H 1/3228* (2019.05); *B60H 2001/006* (2013.01); *B60H 2001/00942* (2013.01)

(58) Field of Classification Search
CPC .............. B60H 1/00535; B60H 1/3229; B60H 2001/006; B60K 5/1216; B60Y 2306/09
See application file for complete search history.

(56) References Cited

U.S. PATENT DOCUMENTS 10,254,019 B2 4/2019 Yoo et al.
10,427,500 B2 10/2019 Kim et al.
(Continued)

FOREIGN PATENT DOCUMENTS

CN 102548780 A 7/2012
CN 104976814 A 10/2015
(Continued)

OTHER PUBLICATIONS

European Patent Office, International Search Report (with English translation) and Written Opinion of corresponding International Application No. PCT/EP2022/68354, dated Jul. 1, 2022.
(Continued)

*Primary Examiner* — Lionel Nouketcha
(74) *Attorney, Agent, or Firm* — Valeo Electrification

(57) ABSTRACT

The invention relates to a heat-producing unit intended to be fitted to a motor vehicle, the heat-producing unit including at least a heat-transport fluid circuit and a refrigerant-fluid circuit and having a plurality of components selected from at least one refrigerant compression member, a refrigerant expansion member and at least one heat exchanger configured to exchange heat energy between the refrigerant fluid and the heat-transport fluid. The heat-producing unit includes at least one fluid interface intended to connect the heat-transport fluid circuit to an installation external to the heat-producing unit. The heat-producing unit includes a thermal and acoustic insulation device.

19 Claims, 7 Drawing Sheets

(56) References Cited

U.S. PATENT DOCUMENTS

| | | | | |
|---|---|---|---|---|
| 11,440,376 | B2 | 9/2022 | Calderone | |
| 11,739,756 | B2 | 8/2023 | Whiteman | |
| 2008/0090137 | A1 | 4/2008 | Buck et al. | |
| 2009/0142628 | A1 | 6/2009 | Okada et al. | |
| 2011/0146318 | A1 | 6/2011 | Wittmann et al. | |
| 2012/0174602 | A1 | 7/2012 | Olivier et al. | |
| 2014/0298840 | A1 * | 10/2014 | Yahia | B60H 1/00885 62/190 |
| 2018/0238635 | A1 | 8/2018 | Chopard et al. | |
| 2019/0039440 | A1 * | 2/2019 | Calderone | B60K 7/0007 |

FOREIGN PATENT DOCUMENTS

| | | | | |
|---|---|---|---|---|
| CN | 108138643 | A | 6/2018 | |
| EP | 1614559 | A1 * | 1/2006 | B60H 1/00364 |
| EP | 2977261 | A1 | 1/2016 | |
| JP | 2006128013 | A | 5/2006 | |
| JP | 2009134938 | A | 6/2009 | |
| JP | 2010507198 | A | 3/2010 | |
| JP | 2011126522 | A | 6/2011 | |
| JP | 2015207611 | A | 11/2015 | |
| JP | 2018103694 | A | 7/2018 | |
| KR | 20190068125 | A | 6/2019 | |
| WO | 2020003693 | A1 | 1/2020 | |

OTHER PUBLICATIONS

European Patent Office, Office Action (with English translation) of corresponding European Application No. 22736293.6 , dated May 22, 2025, 18 pages.

Japan Patent Office, Office Action (with English translation) of corresponding Japanese Application No. 2024-501617, dated Mar. 21, 2025, 18 pages.

Japan Patent Office, Search Report (with English translation) of corresponding Japanese Application No. 2024-501617, dated Mar. 21, 2025, 25 pages.

China Patent Office, Office Action (with English Translation) of corresponding Chinesel Application No. 202280045766.4, dated Mar. 30, 2026, 20 pages.

* cited by examiner

HEAT PRODUCING UNIT FOR A MOTOR VEHICLE

TECHNICAL FIELD

The present invention comes within the field of heat-transfer fluid thermal regulation systems installed on a hybrid or electric motor vehicle, and more particularly of a heat-producing unit of thermal regulation systems of this type.

BACKGROUND OF THE INVENTION

Electric or hybrid vehicles are generally equipped with different electrical and/or electronic components, such as an electric battery pack for example, which provides the energy necessary for the electric and/or hybrid vehicle to travel. It is known to equip electric or hybrid vehicles of this type with a refrigerant fluid circuit and a heat-transfer fluid circuit, with the latter participating in particular in regulating thermally certain electrical and/or electronic components of the electric or hybrid vehicle, or certain areas thereof.

In addition, the refrigerant fluid circuit regulates the temperature of the heat-transfer fluid circulating in the heat-transfer fluid circuit. For this purpose, the refrigerant fluid exchanges calories with the heat-transfer fluid, in order to increase or decrease the temperature of the heat-transfer fluid. It is understood that the refrigerant fluid makes it possible to cool or heat the heat-transfer fluid, in order for it then to regulate the temperature of certain electrical and/or electronic components of the electric or hybrid vehicle.

In general, the refrigerant fluid circuit comprises at least one duct, on which different refrigerant fluid control elements are installed, such as a unit for compression of the refrigerant fluid, a unit for expansion of the refrigerant fluid, and at least one heat exchanger between the refrigerant fluid and the heat-transfer fluid. These different elements for control of the refrigerant fluid are configured to increase or decrease the pressure of the refrigerant fluid, such that the refrigerant fluid then regulates the temperature of the heat-transfer fluid at the heat exchanger.

Motor vehicle manufacturers are seeking to reduce the size and dimensions of the refrigerant fluid circuit, such as to free space for other components of the vehicle. In other words, refrigerant fluid circuits of this type will henceforth have reduced sizes, also giving rise to a reduction in the length of the ducts of said refrigerant fluid circuit. This reduction gives rise to a first technical problem solved by the invention. In fact, the long length of the ducts in the systems according to the prior art acts as a vibration damper, which ultimately reduces the vibratory transmission. By reducing this length of the duct, the vibratory transmission is increased, which the invention presented here corrects.

It is also known to install refrigerant fluid circuits of this type and/or heat-transfer fluid circuits of this type on the vehicle, by securing it/them directly on a chassis of the electric or hybrid vehicle. However, this securing mode, combined with the reduction in the length of the ducts of the refrigerant fluid circuit, gives rise to an increase in the vibrations transmitted to the chassis, and in fine to the occupants of the electric or hybrid vehicle in the passenger space of said vehicle.

In this context, the present invention presents a solution to these problems, by proposing a system which makes it possible both to provide mechanical retention of the components of a refrigerant fluid circuit and a heat-transfer fluid circuit relative to one another, and both relative to the exterior environment, while providing vibratory, thermal and acoustic insulation of said circuits.

SUMMARY OF THE INVENTION

The main objective of the present invention is thus a heat-producing unit which is designed to equip a vehicle, in particular a motor vehicle, and is configured to treat a heat-transfer fluid thermally, with the heat-producing unit comprising at least one heat-transfer fluid circuit which is designed to have a heat-transfer fluid passing through it, and a refrigerant fluid circuit in which a refrigerant fluid circulates, and comprising at least one unit for compression of the refrigerant fluid, a unit for expansion of the refrigerant fluid, at least one heat exchanger which is configured to exchange calories between the refrigerant fluid and the heat-transfer fluid, and ducts connecting these components which constitute the refrigerant fluid circuit, characterized in that the heat-producing unit comprises at least one fluid interface which is designed to connect the heat-transfer fluid circuit to an installation outside the heat-producing unit, and in that the heat-producing unit comprises a thermal and acoustic insulation device which extends at least partly around the components of the refrigerant fluid circuit, with the thermal and acoustic insulation device maintaining the position of the components of the refrigerant fluid circuit within the heat-producing unit.

The fluid interface makes it possible to connect the heat-transfer fluid circuit fluidically to an installation on the exterior of the heat-producing unit, thus making it possible to connect this heat-transfer fluid circuit at a single point to heat-transfer fluid ducts outside the heat-producing unit.

It is understood that the thermal and acoustic insulation device makes it possible alone to maintain at least the refrigerant fluid circuit mechanically in position in the heat-producing unit, relative to the other elements of the heat-producing unit, such as, for example, the heat-transfer fluid circuit or the interface. In other words, the thermal insulation device blocks the position of the components of the refrigerant fluid circuit in the heat-producing unit, such that the refrigerant fluid circuit remains in position in the heat-producing unit, when said unit according to the invention is put into use.

As well as assuring the mechanical retention of the refrigerant fluid circuit, the thermal and acoustic insulation device makes it possible to reduce as much as possible the heat exchanges between the refrigerant fluid circuit and the environment on the exterior of the heat-producing unit. In addition, the thermal and acoustic insulation device also reduces the propagation of the vibrations produced by the refrigerant fluid circuit towards the exterior environment of the heat-producing unit, and in particular towards the passenger space of the vehicle.

The refrigerant fluid circuit is configured to control the pressure and temperature of the refrigerant fluid, with the fluid then regulating the temperature of the heat-transfer fluid circulating in the heat-transfer fluid circuit, in particular by exchanging calories at the heat exchangers.

For this purpose, the compression unit serves the purpose of compressing the refrigerant fluid when it is circulating through said compression unit. In other words, the compression unit increases the pressure of the refrigerant fluid, with the refrigerant fluid circulating downstream from the compression unit having a pressure higher than the pressure of the refrigerant fluid circulating upstream from the compression unit.

On the other hand, the purpose of the expansion unit is to expand the refrigerant fluid when the fluid is circulating through it. In other words, the expansion unit decreases the pressure of the refrigerant fluid, with the refrigerant fluid circulating downstream from the expansion unit having a pressure lower than the pressure of the refrigerant fluid circulating upstream from the expansion unit.

The heat exchanger comprises for example a passage positioned between the compression unit and the expansion unit, such that the refrigerant fluid circulates in this passage of the heat exchanger, from the compression unit to the expansion unit. This heat exchanger comprises a second passage which the heat-transfer fluid follows. According to one configuration, the refrigerant fluid which circulates through the heat exchanger can serve the purpose of increasing the temperature of the heat-transfer fluid circulating through said heat exchanger, with the refrigerant fluid yielding calories to the heat-transfer fluid.

The heat exchanger can also be positioned between the expansion unit and the compression unit, such that the refrigerant fluid circulates through a channel of the heat exchanger, from the expansion unit, to the compression unit. This heat exchanger comprises a second channel which the heat-transfer fluid follows. In this configuration, the refrigerant fluid which circulates through the heat exchanger serves the purpose of decreasing the temperature of the heat-transfer fluid circulating through the second channel, with the refrigerant fluid capturing calories from the heat-transfer fluid.

According to another, optional characteristic of the invention, the heat-producing unit comprises a first heat exchanger, with the heat exchanger which is configured to exchange calories between the refrigerant fluid and a heat-transfer fluid being a second heat exchanger which is configured to exchange calories between the refrigerant fluid and a heat-transfer fluid, and at least one of the two heat exchangers is installed on the exterior of the thermal and acoustic insulation device.

According to one embodiment, the first heat exchanger and the second heat exchanger are retained in the heat-producing unit by the thermal and acoustic insulation device.

According to another optional characteristic of the invention, the first heat exchanger is used as a gas condenser or cooler, with the second heat exchanger being used as an evaporator.

According to an optional characteristic of the invention, the heat-producing unit comprises at least one fluid connection interface between the refrigerant fluid circuit and a heat exchanger installed on the exterior of the thermal and acoustic insulation device. This is the case in particular when one of the two heat exchangers of the refrigerant fluid circuit is on the exterior of the thermal and acoustic insulation device. It is therefore necessary to facilitate the circulation of the refrigerant fluid between the interior of the heat-producing unit and the exterior thereof, and the fluid connection interface referred to here achieves this objective.

According to an optional characteristic of the invention, the heat-producing unit comprises an envelope which participates in delimiting at least partly an inner volume which receives the components of the refrigerant fluid circuit and the heat-transfer fluid circuit, with the thermal and acoustic insulation device taking the form of a foam which extends at least into the inner volume between the envelope and the components of the refrigerant fluid circuit and the heat-transfer fluid circuit. More specifically, the envelope comprises a plurality of walls, the inner faces of which participate in delimiting the inner volume which receives the components of the refrigerant fluid circuit and the heat-transfer fluid circuit, with the thermal and acoustic insulation device extending between the inner face of at least one of the walls of the envelope and the components of the refrigerant fluid circuit and the heat-transfer fluid circuit, such as to retain the latter physically.

According to another optional characteristic of the invention, the thermal and acoustic insulation device maintains, in particular by itself, the position of the components of the heat-transfer fluid circuit within the heat-producing unit. It is understood that the thermal and acoustic insulation device extends at least partly around the heat-transfer fluid circuit, with the thermal and acoustic insulation device maintaining the position of the heat-transfer fluid circuit within the heat-producing unit.

In addition, the thermal and acoustic insulation device maintains the position of the refrigerant fluid circuit and the position of the heat-transfer fluid circuit relative to one another within the heat-producing unit. This therefore prevents mechanical interference between these elements.

According to one embodiment, the thermal and acoustic insulation device comprises a first half-shell and a second half-shell which cooperate with one another in order to delimit receptacles in which the components of the refrigerant fluid circuit and the heat-transfer fluid circuit extend. According to this embodiment, the half-shells are preformed separately from one another before being installed around components of the refrigerant fluid circuit and the heat-transfer fluid circuit. It is understood that the mechanical strength of the components of the refrigerant fluid circuit and the heat-transfer fluid circuit is provided by the cooperation of the half-shells with one another.

According to another optional characteristic of the invention, the heat-producing unit comprises at least one device for securing of the heat-producing unit, which is designed to secure the heat-producing unit on a chassis of a vehicle. The securing device renders the heat-producing unit integral with the chassis of the vehicle, blocking the position of the heat-producing unit on the vehicle.

According to another optional characteristic of the invention, the securing device comprises a base and a rod projecting from the base, as well as an insulating cylinder installed around the rod, with the securing device comprising a wall which is integral with the insulating cylinder and the thermal and acoustic insulation device. It is understood that the wall is installed around the insulating cylinder, while assuring a mechanical connection of the insulating cylinder with the thermal and acoustic insulation device. Advantageously, the insulating cylinder limits the transmission of vibrations from the heat-producing unit towards its exterior environment.

The rod and the base preferably comprise the same material. The rod and the base also have sufficient rigidity to prevent the mechanical deformation of the securing device once it is installed on the heat-producing unit and on the chassis of the vehicle.

According to another optional characteristic of the invention, the securing device extends in the inner volume which is delimited at least partly by the envelope, with the thermal and acoustic insulation device maintaining the position of the securing device within the inner volume delimited at least partly by the envelope. It is understood that the thermal and acoustic insulation device retains in position, for example by itself, the refrigerant fluid circuit, the heat-transfer fluid circuit, and at least one or more securing devices relative to one another, within the heat-producing unit.

According to another optional characteristic of the invention, the heat-producing unit comprises at least one electrical interface, which is designed to connect at least one of the components of the refrigerant fluid circuit electrically to a control unit on the exterior of the heat-producing unit.

According to another optional characteristic of the invention, the heat-producing unit comprises an electrical network which connects the compression unit and/or the expansion unit to the electrical interface, with the electrical network connecting the compression unit and/or the expansion unit electrically to the control unit on the exterior of the heat-producing unit.

According to another optional characteristic of the invention, the heat-producing unit comprises at least one sensor for the pressure of the refrigerant fluid positioned between the compression unit and the first heat exchanger. It is understood that the pressure sensor transmits information concerning the pressure of the refrigerant fluid circulating downstream from the compression unit to the control unit via an electrical cable which extends from the pressure sensor as far as the electrical interface.

According to another optional characteristic of the invention, the heat-producing unit comprises at least one sensor for the temperature of the refrigerant fluid positioned between the compression unit and the first heat exchanger.

According to another optional characteristic of the invention, the heat-producing unit comprises at least one sensor for the temperature of the refrigerant fluid positioned between the compression unit and the second heat exchanger.

According to another characteristic of the invention, the heat-producing unit comprises at least one sensor for the temperature of the heat-transfer fluid positioned on the heat-transfer fluid circuit.

According to another optional characteristic of the invention, the thermal insulation device comprises at least one material selected from among polyurethane, melamine, polyethylene and/or polyester.

According to another optional characteristic of the invention, one of the components of the refrigerant fluid circuit is an internal heat exchanger which exchanges calories between a low-pressure portion of the refrigerant fluid circuit and a high-pressure portion of the refrigerant fluid circuit. It is understood that the low-pressure portion of the refrigerant fluid circuit corresponds to the portion in which the refrigerant fluid extends from the expansion unit as far as the compression unit, with the high-pressure portion of the refrigerant fluid circuit corresponding to the portion in which the refrigerant fluid is positioned between the compression unit and the expansion unit.

The subject of the present invention is also a vehicle comprising at least one heat-producing unit according to any one of the preceding characteristics, an external installation through which heat-transfer fluid passes, and a chassis, the external installation being connected to the heat-transfer fluid circuit by means of the fluid interface.

The external installation relates for example to a system for distribution of the heat-transfer fluid, which guides the heat-transfer fluid from the heat-producing unit to one or more components of the electric or hybrid vehicle, for the purpose of heat-treating them. It is understood that the fluid interface of the production unit makes it possible to connect the heat-transfer fluid circuit to said external installation in a simplified manner.

According to a solution of the invention, the heat-producing unit being secured to the chassis of the vehicle by means of the securing device.

According to an alternative solution of the invention, the chassis participates at least partly in delimiting a cavity in which the heat-producing unit is installed, with the thermal and acoustic insulation device extending at least between one of the components of the refrigerant fluid circuit and the chassis. In this case, the chassis is considered in the sense of a structural component of the vehicle, i.e. an element of the underbody or body of the vehicle.

The present invention also relates to a method for assembly of a heat-producing unit according to any one of the preceding characteristics, comprising at least one step of assembly of the refrigerant fluid circuit, a step of assembly of the heat-transfer fluid circuit, and a step of installation of the thermal and acoustic insulation device at least around components of the refrigerant fluid circuit.

According to another optional characteristic of the invention, the method comprises a step of installation of the refrigerant fluid circuit and the heat-transfer fluid circuit in an inner volume which is delimited at least partly by an envelope, the thermal and acoustic insulation device being poured into the inner volume.

According to another optional characteristic of the invention, the method comprises a step of installation of the components of the refrigerant fluid circuit and the heat-transfer fluid circuit in receptacles which are delimited by the first half-shell and the second half-shell. The two half-shells are then assembled against one another, and the assembly is positioned in the inner volume of the envelope or in the cavity formed in the chassis of the vehicle.

According to another optional characteristic of the invention, during the step of installation of the thermal and acoustic insulation device, the fluid interface is positioned such that at least one of its faces remains accessible from the exterior of the heat-producing unit.

Finally, the subject of the invention is a method for installation of a heat-producing unit on a vehicle according to any one of the preceding characteristics, with the heat-producing unit being assembled according to any one of the characteristics of the assembly method described above, and the installation method comprising at least one step of securing of the securing devices on the chassis.

According to another optional characteristic of the invention, the installation method comprises at least one step of arrangement of at least the components of the refrigerant fluid circuit, and advantageously of the heat-transfer fluid circuit, of the heat-producing unit, in a cavity which is delimited at least partly by the chassis, and a step of pouring of the thermal and acoustic insulation device such that they extend between a component of the refrigerant fluid circuit and a wall of the chassis delimiting the cavity. Alternatively, there can be a step in which the two half-shells are positioned in the cavity of the chassis.

BRIEF DESCRIPTION OF DRAWINGS

Other characteristics, details and advantages of the invention will become more apparent from reading the following description on the one hand, and from several embodiments provided by way of non-limiting indication with reference to the appended schematic drawings on the other hand, in which.

DETAILED DESCRIPTION OF THE INVENTION

The characteristics, variants and different embodiments of the invention can be combined with one another, in various combinations, as long as they are not mutually incompatible or mutually exclusive. It will be possible, in particular, to conceive of variants of the invention that comprise only a selection of the characteristics described hereinafter, in isolation from the other characteristics described, if this selection of characteristics is sufficient to confer a technical advantage and/or to distinguish the invention from the prior art.

In the figures, elements that are common to a plurality of figures retain the same reference.

In addition, the terms "upstream" and "downstream" used hereinafter in the description refer to the direction of circulation of a refrigerant fluid within a refrigerant fluid circuit and of a heat-transfer fluid within a heat-transfer fluid circuit.

Figure 1:
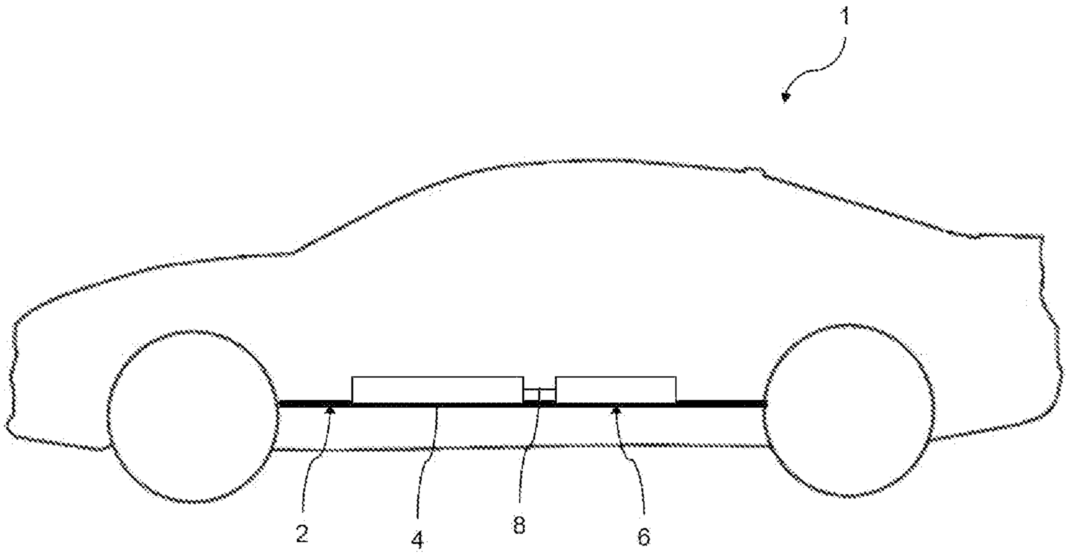
FIG. 1 is a schematic representation of a vehicle comprising a heat-producing unit according to the invention.

FIG. 1 illustrates an electric or hybrid motor vehicle 1 comprising at least a chassis 2, an electrical and/or electronic component 4, and a heat-producing unit 6 according to the invention The chassis 2 of the vehicle 1 in this case corresponds to a support structure on which components of the electric or hybrid vehicle 1 are installed. As illustrated here, the electrical and/or electronic component 4 and the heat-producing unit 6 are installed on the chassis 2 of the vehicle 1.

"Electrical and/or electronic component 4" means a component of the electric or hybrid vehicle 1 which uses electrical energy in order to drive the electric or hybrid vehicle 1, and/or which stores electrical energy for the purpose of being used by an electrical and/or electronic component 4 of the electric or hybrid vehicle 1. More specifically, the electrical and/or electronic component 4 of the electric or hybrid vehicle 1 can for example be an electric or hybrid motor or an electrical energy storage unit which can supply electrical energy to an electric motor of the electric or hybrid vehicle 1.

The electrical and/or electronic component 4 of the electric or hybrid vehicle 1 has an optimal operating temperature range. When the temperature of the electrical and/or electronic component 4 is outside this optimal temperature range, the performance levels of the electrical and/or electronic component 4 decrease.

Figure 6:
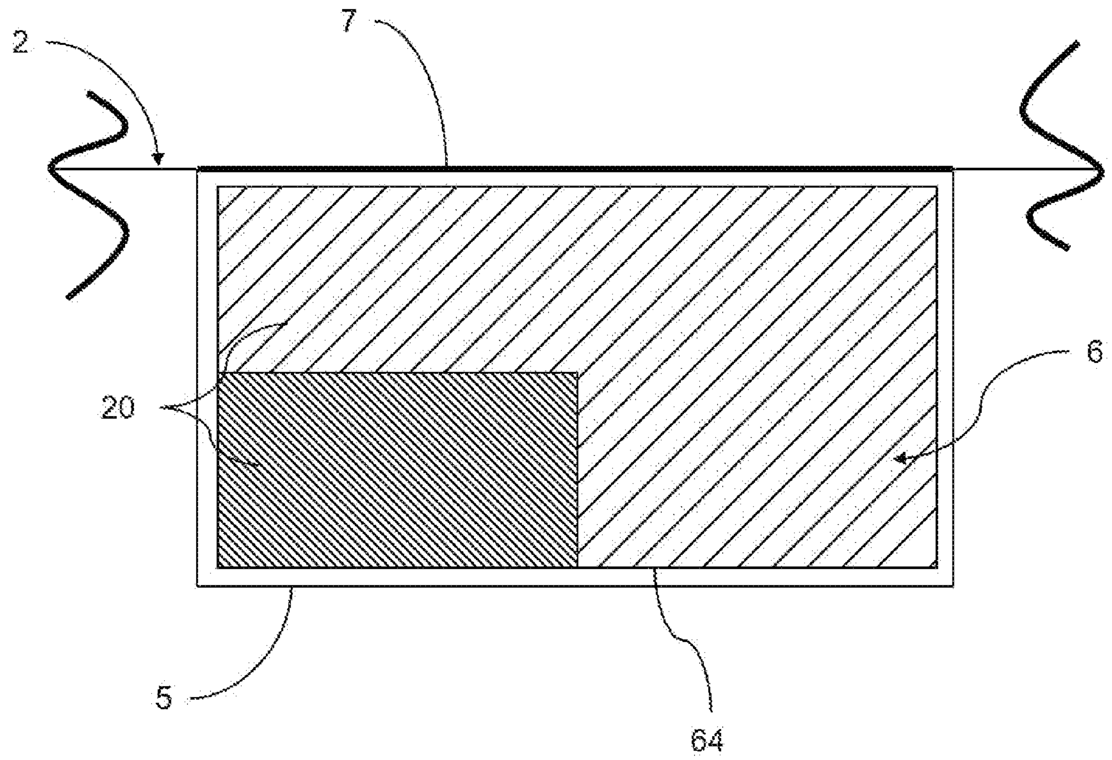
FIG. 6 is a schematic representation in cross-section of the heat-producing unit installed in a cavity of the vehicle represented in FIG. 1.

In addition, and as illustrated in FIG. 6, the chassis 2 comprises a cavity 5 in which the heat-producing unit 6 is installed. More particularly, the cavity 5 is in the form of a recess on a main plane of extension of the chassis 2, which recess has dimensions such as to be able to accommodate the heat-producing unit 6. The heat-producing unit 6 is also retained in position in the cavity 5 of the chassis 2 by an element 7 for retention in position, which for example can be a strap positioned at the opening of the cavity 5.

Advantageously, the walls of the cavity 5 provide clamped guiding of the heat-producing unit 6, such as to retain said heat-producing unit 6 in position in at least two directions perpendicular to one another, with the element 7 for retention in position blocking the position of the heat-producing unit 6 in a third direction perpendicular to the two aforementioned directions.

The electric or hybrid vehicle 1 comprises a system 8 for distribution of the heat-transfer fluid, which is configured to regulate the temperature of the electrical and/or electronic component 4. Thanks to the circulation of the heat-transfer fluid, the distribution system 8 makes it possible to cool or heat the electrical and/or electronic component 4, in order for it to have a temperature contained in its optimum temperature range.

The heat-producing unit 6 of the electric or hybrid vehicle 1 for its part participates in controlling the pressure and temperature of a refrigerant fluid, with this fluid affecting the heat-transfer fluid thermally. It is understood that the heat-producing unit 6 regulates the temperature of the refrigerant fluid, which increases or decreases the temperature of the heat-transfer fluid in order for said heat-transfer fluid then to heat or cool the electrical and/or electronic component 4. Alternatively or in a complementary manner, the heat-producing unit 6 can regulate the temperature of the heat-transfer fluid in order to affect the temperature of the passenger space of the vehicle.

As illustrated in FIGS. 2 to 5, the heat-producing unit 6 comprises at least one heat-transfer fluid circuit 10 which is designed to have the heat-transfer fluid passing through it, and a refrigerant fluid circuit 12, in which the refrigerant fluid circulates. The refrigerant fluid circuit is a closed loop, which is entirely constituted in the interior of the heat-producing unit according to the invention.

Figure 3:
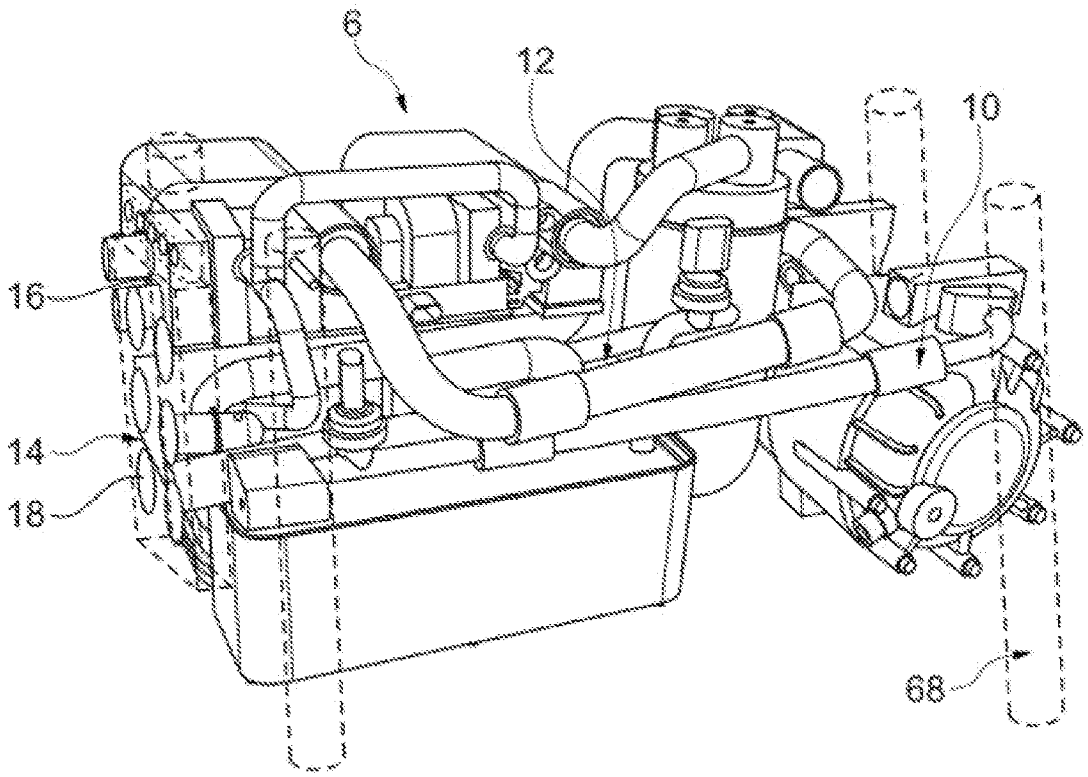
FIG. 3 is a representation in perspective of the heat-producing unit represented in FIG. 1, comprising a refrigerant fluid circuit, a heat-transfer fluid circuit and a securing device.

According to the invention, the heat-producing unit 6 comprises at least one fluid interface 14 which is designed to connect at least the heat-transfer fluid circuit 10 to an installation outside the heat-producing unit 6, with the external installation being able for example to be the aforementioned heat-transfer fluid distribution system 8. As illustrated in FIG. 3, the fluid interface 14 is for example in the form of a flat wall 16 extending mainly on a plane, with the fluid interface 14 comprising at least one through orifice 18 which is connected fluidically to the heat-transfer fluid circuit 10 on the one hand, and to the external installation on the other hand. In this configuration, the heat-transfer fluid circulates from the heat-transfer fluid circuit 10 to the external installation, and conversely, passing through at least one of the through orifices 18 of the fluid interface 14.

Figure 2:
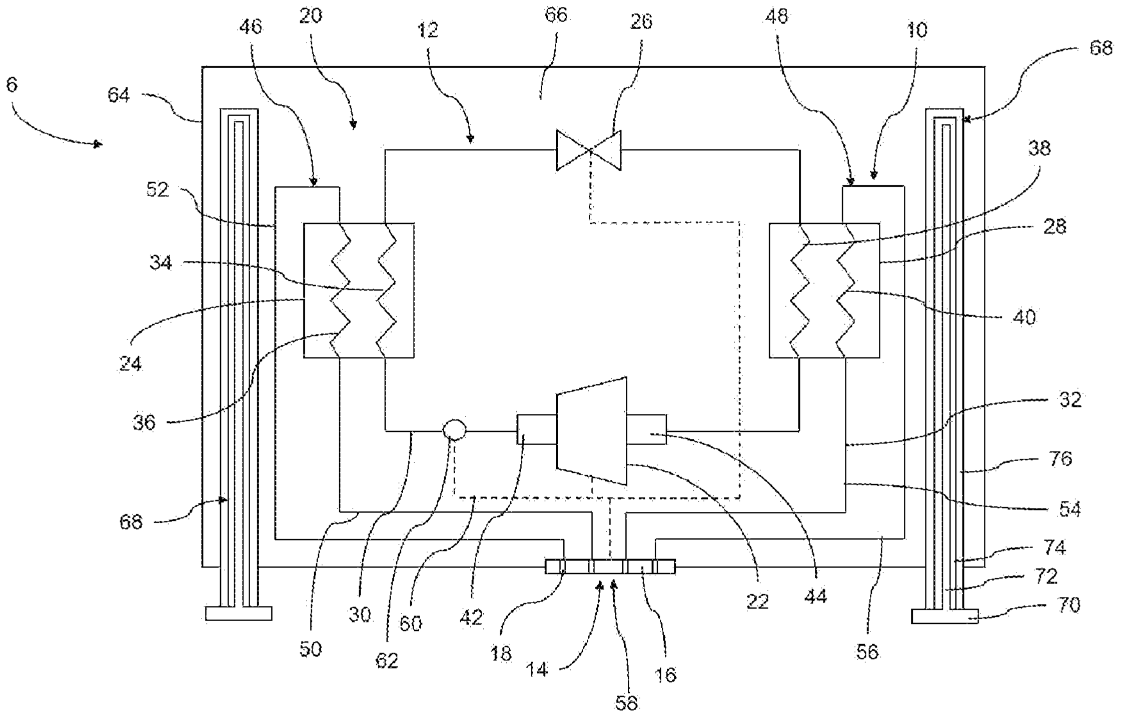
FIG. 2 is a schematic representation of a refrigerant fluid circuit and a heat-transfer fluid circuit of the heat-producing unit represented in FIG. 1.

As illustrated in FIG. 2, the heat-producing unit 6 also comprises a thermal and acoustic insulation device 20, which extends at least partly around the refrigerant fluid circuit 12, with the thermal and acoustic insulation device 20 maintaining the position of the refrigerant fluid circuit 12 within the heat-producing unit 6. As well as preventing thermal exchanges between the refrigerant fluid circuit 12 and the environment on the exterior of the heat-producing unit 6, the thermal and acoustic insulation device 20 makes it possible to limit the propagation of acoustic waves produced by the refrigerant fluid circuit 12 to the exterior of the heat-producing unit 6, to limit the propagation of vibration, and to block the mechanical position of the components which constitute the refrigerant fluid circuit 12 within the heat-producing unit 6.

As shown more particularly in the example illustrated in FIG. 2, the refrigerant fluid circuit 12 comprises a plurality of components selected from at least one unit 22 for compression of the refrigerant fluid, a first heat exchanger 24 which is configured to exchange calories between the refrigerant fluid and a heat-transfer fluid, a unit 26 for expansion of the refrigerant fluid, and at least one second heat exchanger 28, which is configured to exchange calories between the refrigerant fluid and the heat-transfer fluid, and ducts 30, 32, connecting these components which constitute the refrigerant fluid circuit 12.

According to the example illustrated here in FIG. 2, the refrigerant fluid circuit 12 comprises a high-pressure duct 30 extending between the compression unit 22 and the expansion unit 26, and a low-pressure duct 32 extending between the expansion unit 26 and the compression unit 22. More particularly, the refrigerant fluid circulates in the high-pressure duct 30 from the compression unit 22 to the expansion unit 26, and in the low-pressure duct 32 from the expansion unit 26 to the compression unit 22.

The compression unit 22 serves the purpose of compressing the refrigerant fluid when it is circulating through said compression unit 22. Conversely, the expansion unit 26 serves the purpose of expanding the refrigerant fluid when it is circulating through said expansion unit 26. It is thus understood that the pressure of the refrigerant fluid circulating in the high-pressure duct 30 is higher than the pressure of the refrigerant fluid circulating in the low-pressure duct 32.

In addition, the refrigerant fluid circuit 12 in this case comprises the first heat exchanger 24, which is installed on the high-pressure duct 30, and the second heat exchanger 28, which is installed on the low-pressure duct 32. However, a refrigerant fluid circuit 12 comprising only a single one of the heat exchangers 24, 28 would not depart from the context of the invention.

The first heat exchanger 24 comprises a first passage 34 and a second passage 36, with the first passage 34 having the refrigerant fluid passing through it, whereas the second passage 36 is configured to have the heat-transfer fluid passing through it. It is understood that the first passage 34 constitutes the high-pressure duct 30, with the refrigerant fluid circulating through the high-pressure duct 30 from the compression unit 22 to the expansion unit 26 also circulating through the first passage 34 of the first heat exchanger 24. In addition, the high-pressure duct 30 and the first passage 34 of the first heat exchanger 24 form a high-pressure portion of the refrigerant fluid circuit 12.

In this configuration, the refrigerant fluid circulating within the first passage 34 of the first heat exchanger 24 serves the purpose of increasing the temperature of the heat-transfer fluid circulating within the second passage 36 of the first heat exchanger 24, with the refrigerant fluid yielding calories to the heat-transfer fluid.

The second heat exchanger 28 comprises a first channel 38 and a second channel 40, with the first channel 38 having the refrigerant fluid passing through it, whereas the second channel 40 is configured to have the heat-transfer fluid passing through it. It is understood that the first channel 38 constitutes the low-pressure duct 32, with the refrigerant fluid circulating through the low-pressure duct 32 from the expansion unit 26 to the compression unit 22 also circulating through the first channel 38 of the second heat exchanger 28. In addition, the low-pressure duct 32 and the first channel 38 of the second heat exchanger form a low-pressure portion of the refrigerant fluid circuit 12.

In this configuration, the refrigerant fluid circulating through the first channel 38 of the second heat exchanger 28 serves the purpose of decreasing the temperature of the heat-transfer fluid circulating through the second channel 40 of the second heat exchanger 28, with the refrigerant fluid capturing calories from the heat-transfer fluid.

In operation, the first heat exchanger 24 is in this case used as a condenser—for a sub-critical refrigerant fluid—or as a gas cooler—for a super-critical refrigerant fluid, with the second heat exchanger 28 being used as an evaporator.

It is understood from the foregoing that, in the first heat exchanger 24, the refrigerant fluid yields calories to the heat-transfer fluid, thus giving rise to a decrease in the temperature of the refrigerant fluid. This decrease in the temperature of the refrigerant fluid can give rise to a change of state of the refrigerant fluid, making it go from a gaseous state to a diphasic, or liquid state, depending on the type of refrigerant fluid used.

In the second heat exchanger 28, the refrigerant fluid captures calories from the heat-transfer fluid, thus giving rise to an increase in the temperature of the refrigerant fluid. This increase in the temperature of the refrigerant fluid can give rise to a change of state of the refrigerant fluid, making it go from a liquid state to a diphasic, or gaseous state.

According to an alternative of the invention, at least one of the heat exchangers 24, 28 is installed on the exterior of the heat-producing unit 6, with this unit comprising at least one fluid connection interface between the refrigerant fluid circuit 12 and the heat exchanger 24, 28 installed outside the heat-producing unit 6. It is understood here that one of the heat exchangers 24, 28 is installed spaced from the heat-producing unit 6, while being fluidically connected to the refrigerant fluid circuit 12.

In this alternative configuration, the fluid connection interface is similar to the fluid interface 14, and comprises a wall with through-holes such as to be able to connect the refrigerant fluid circuit 12 extending in the heat-producing unit 6 in a sealed manner to one or a plurality of ducts extending on the exterior of the heat-producing unit 6, between the unit and the heat exchanger 24, 28 positioned on the exterior of the heat-producing unit 6. In addition, the fluid interface 14 and the fluid connection interface form a single interface bearing firstly the through-orifices 18 which are connected fluidically to the heat-transfer fluid circuit 10, and the through-holes which are connected fluidically to the refrigerant fluid circuit 12.

In addition, the heat exchanger 24, 28 which is installed spaced from the heat-producing unit 6 can for example be a condenser of a ventilation, heating and/or air-conditioning system of the vehicle 1, an evaporator of a system of this type, or also a condenser of a front face of the vehicle 1.

Preferably, one of the components of the refrigerant fluid circuit 12 is an internal heat exchanger which exchanges calories between the low-pressure portion of the refrigerant fluid circuit 12, and the high-pressure portion of the refrigerant fluid circuit 12. In this case, the heat exchanger comprises a first duct 42 and a second duct 44, with the first duct 42 being configured to have passing through it refrigerant fluid circulating from the compression unit 22 to the expansion unit 26, and the second duct 44 being configured to have passing through it refrigerant fluid circulating from the expansion unit 26 to the compression unit 22.

It is understood that an exchange of calories takes place between hot refrigerant fluid circulating downstream from the compression unit 22, and cold refrigerant fluid circulating downstream from the expansion unit 26. The compressed refrigerant fluid thus yields calories to the expanded refrigerant fluid.

The heat-transfer fluid circuit 10 for its part comprises at least one heating duct 46 and one cooling duct 48.

The heating duct 46 comprises a first portion 50 which extends from the fluid interface 14 to the second passage 36 of the first heat exchanger 24, and a second portion 52 which extends from the second passage 36 of the first heat exchanger 24 to the fluid interface 14. It is understood that the second passage 36 of the first heat exchanger constitutes the heating duct 46.

The heat-transfer fluid which circulates through the heating duct 46 is heated by passing through the second passage 36 of the first heat exchanger 24 by capturing calories yielded by the refrigerant fluid circulating through the first passage 34 of the first heat exchanger 24. In other words, the temperature of the heat-transfer fluid circulating in the second portion 52 of the heating duct 46 is higher than the temperature of the heat-transfer fluid circulating in the first portion 50 of the heating duct 46.

The cooling duct 48 comprises a first part 54 which extends from the fluid interface 14 to the second channel 40 of the second heat exchanger 28, and a second part 56 which extends from the second channel 40 of the second heat exchanger 28 to the fluid interface 14. It is understood that the second channel 40 of the second heat exchanger 28 constitutes the cooling duct 48.

The heat-transfer fluid which circulates through the cooling duct 48 is cooled by passing through the second channel 40 of the second heat exchanger 28 by yielding calories to the refrigerant fluid circulating through the first channel 38 of the second heat exchanger 28. In other words, the temperature of the heat-transfer fluid circulating in the second part 56 of the cooling duct 48 is lower than the temperature of the heat-transfer fluid circulating in the first part 54 of the cooling duct 48.

In addition, and as shown in FIG. 2, the heat-producing unit 6 comprises at least one electrical interface 58 which is designed to connect at least one of the components of the refrigerant fluid circuit 12 electrically to a control unit on the exterior of the heat-producing unit 6. The electrical interface 58 and the fluid interface 14 can form a single interface, but a heat-producing unit 6, the electrical interface 58 and the fluid interface 14 of which are independent from one another, would not depart from the context of the invention.

In fact, certain components of the heat-producing unit 6 are electrical and/or electronic, and in order to operate need to receive electrical energy and/or to emit or receive electronic information, in particular electronic instructions. For example, the control unit can receive at least one piece of electrical information from a sensor present in the refrigerant fluid circuit, then emit a command instruction to one of the components present on the circuit depending on the electrical information received from the sensor.

More specifically, the heat-producing unit 6 comprises an electrical network 60, which for example connects the compression unit 22 and/or the expansion unit 26 to the electrical interface 58.

As represented in FIG. 2, the heat-producing unit 6 comprises a sensor 62 for the pressure of the refrigerant fluid placed between the compression unit 22 and the first heat exchanger 24. For example, the pressure sensor 62 transmits information concerning the pressure of the refrigerant fluid circulating downstream from the compression unit 22 to the electrical or electronic control unit, via the electrical network 60 and the electrical interface 58.

Figure 4:
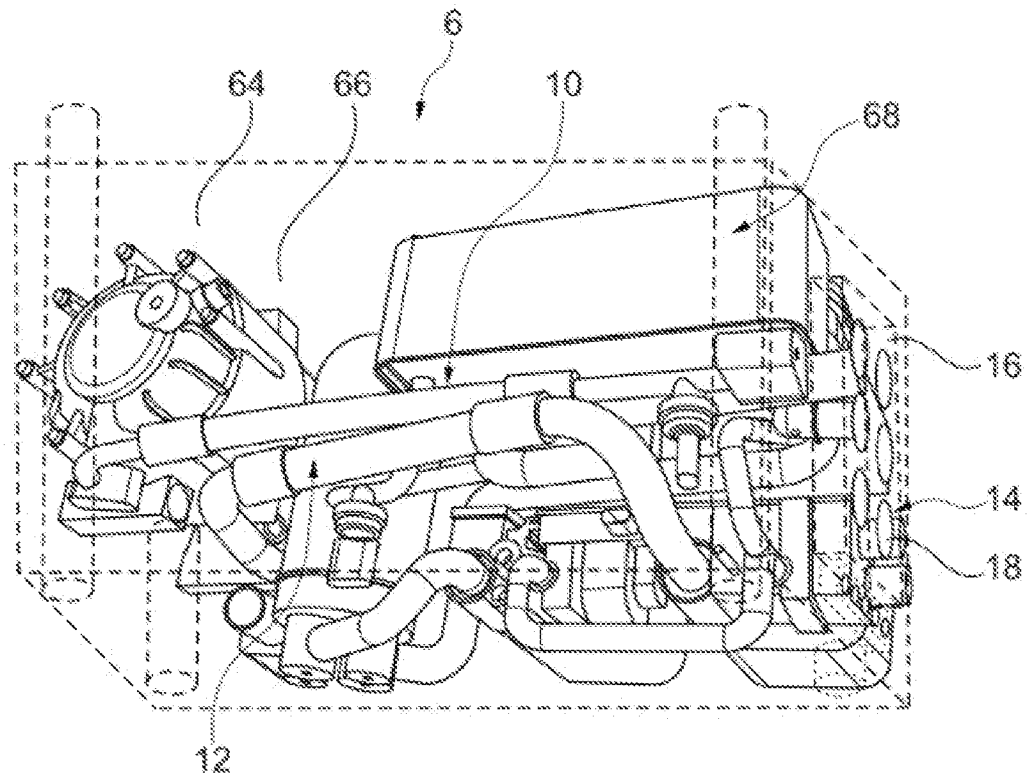
FIG. 4 is a representation in perspective of the heat-producing unit represented in FIG. 3 accommodated in an inner volume delimited by an envelope.

As illustrated in FIGS. 2 and 4, the heat-producing unit 6 comprises an envelope 64 which participates in delimiting at least partly an inner volume 66 which receives the components of the refrigerant fluid circuit 12 and the heat-transfer fluid circuit 10, with the thermal and acoustic insulation device 20 taking the form of a foam which extends at least partly, or totally, in the inner volume 66, between the envelope 64, and the components of the refrigerant fluid circuit 12 and the heat-transfer fluid circuit 10.

More specifically, the envelope 64 comprises a plurality of walls, the inner faces of which participate in delimiting the inner volume 66 which receives the components of the refrigerant fluid circuit 12 and the heat-transfer fluid circuit 10, with the thermal and acoustic insulation device 20 extending between the inner face of at least one of the walls of the envelope 64 and the components of the refrigerant fluid circuit 12, and the heat-transfer fluid circuit 10.

It is understood that the foam which forms the thermal and acoustic insulation device 20 extends in the inner volume 66 between the components of the refrigerant fluid circuit 12, the heat-transfer fluid circuit 10, and the inner face of the walls of the envelope 64, matching the form of each of these components until they are mechanically retained. The foam solidifies in order to block the position of the components of the refrigerant fluid circuit 12 and the heat-transfer fluid circuit 10 relative to one another within the inner volume 66 which is delimited at least partly by the envelope 64, thus blocking these components.

In order to assure all of its functions, the thermal and acoustic insulation device 20 comprises at least one material selected from among polyurethane, melamine, polyethylene and/or polyester. It is understood that each of these materials makes it possible at the same time to insulate the refrigerant fluid circuit 12 thermally and acoustically against the environment on the exterior of the heat-producing unit 6, and to maintain the position of the components of the refrigerant fluid circuit 12 within the heat-producing unit 6.

According to an alternative of the invention, the thermal and acoustic insulation device 20 comprises a first half-shell and a second half-shell which cooperate with one another in order to delimit receptacles in which there extend the components of the refrigerant fluid circuit 12 and the heat-transfer fluid circuit 10. The half-shells are pre-formed separately from one another before being installed around components of the refrigerant fluid circuit 12 and the heat-transfer fluid circuit 10. It is understood that the mechanical strength of the components of the refrigerant fluid circuit 12 and the heat-transfer fluid circuit 10 is provided by the cooperation of the half-shells with one another.

According to the invention, as illustrated in FIGS. 2 to 5, the heat-producing unit 6 comprises at least one device 68 for securing the heat-producing unit 6, which device is designed to secure the heat-producing unit 6 on the chassis 2 of a vehicle 1. The securing device 68 is firstly integral with the heat-producing unit 6, and secondly secured on the chassis 2 of the vehicle 1, thus blocking the position of the heat-producing unit 6 on the vehicle 1. Advantageously, the heat-producing unit 6 comprises a plurality of securing devices 68.

As illustrated more particularly in FIG. 2, the securing device 68 comprises a base 70 and a rod 72 projecting from the base 70, as well as an insulating cylinder 74 installed around the rod 72, with the securing device 68 comprising a wall 76 which is integral with the insulating cylinder 74 and with the thermal and acoustic insulation device 20. It is understood that the wall 76 is installed around the insulating cylinder 74, thus assuring a mechanical connection of the insulating cylinder 74 and the rod 72 with the thermal and acoustic insulation device 20.

Advantageously, the insulating cylinder 74 limits the propagation of the vibrations of the refrigerant fluid circuit 12 and/or of the heat-transfer fluid circuit 10 to the environment on the exterior of the heat-producing unit 6. For this purpose, the insulating cylinder 74 comprises a material selected from among polyurethane, melamine, polyethylene and/or polyester.

Advantageously, the insulating cylinder 74 comprises at least one material which is similar to that of the thermal and acoustic insulation device 20.

In addition, the rod 72 and the base 70 preferably comprise a single material, from the following list: steel, rigid synthetic material, etc. The rod 72 and the base 70 also have rigidity which is sufficient to prevent the mechanical deformation of the securing device 68 once it is installed on the heat-producing unit 6, and secured on the chassis 2 of the vehicle 1.

As shown more particularly in FIG. 2, the securing device extends in the inner volume 66 which is delimited at least partly by the envelope 64, with the thermal and acoustic insulation device 20 maintaining the position of the securing device 68 within this inner volume 66. In other words, the securing device 68 is engaged with the thermal and acoustic insulation device 20.

Figure 5:
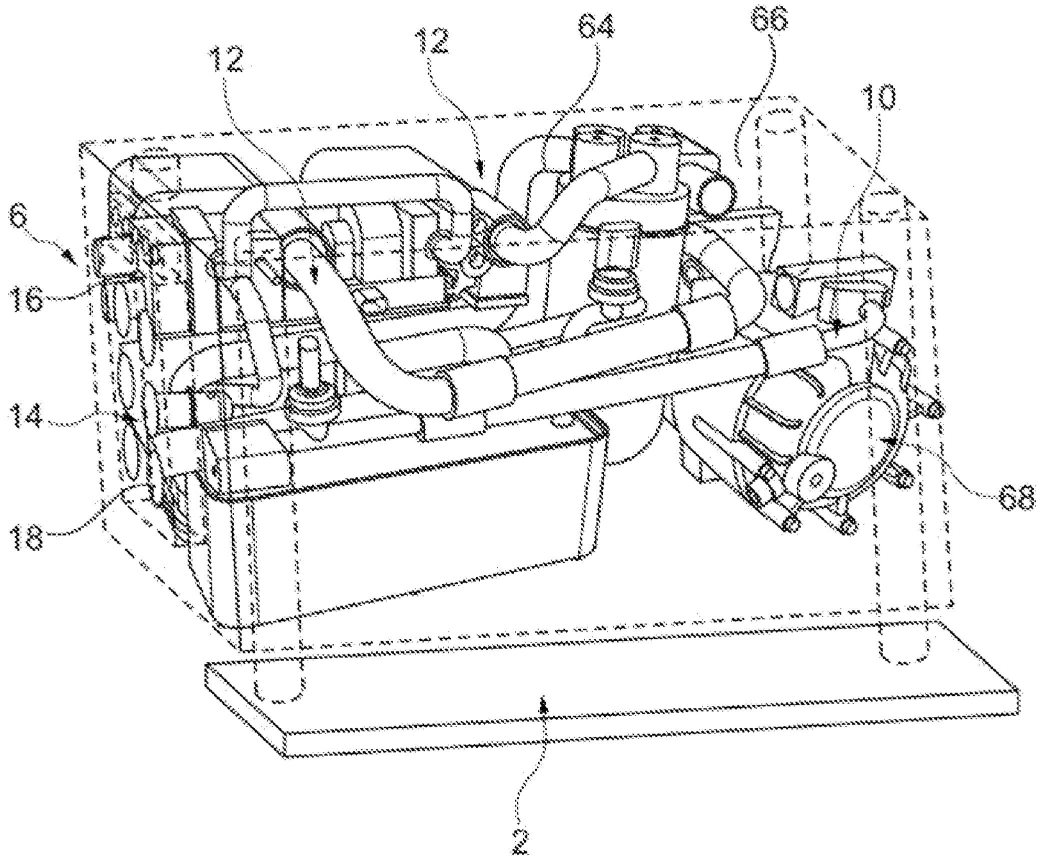
FIG. 5 is a representation in perspective of the heat-producing unit represented in FIG. 3 comprising a thermal and acoustic insulation device.

According to the invention, and as shown more particularly in FIG. 5, the heat-producing unit 6 is rendered integral with the chassis 2 of the vehicle 1 by means of the securing device 68. In fact, the securing device 68 is rendered integral with the chassis 2 by attachment means such as screwing, adhesion or welding.

According to an alternative of the invention, the chassis 2 participates at least partly in delimiting a cavity in which the heat-producing unit 6 is installed, with the thermal and acoustic insulation device 20 extending at least between one of the components of the refrigerant fluid circuit 12 and the chassis 2. In other words, it can be defined that one of the walls of the envelope 64 of the heat-producing unit 6 is a wall of the chassis 2, with the envelope 64 and the chassis 2 participating in delimiting the inner volume 66 in which the refrigerant fluid circuit 12 and the heat-transfer fluid circuit 10 are installed.

Figure 7:
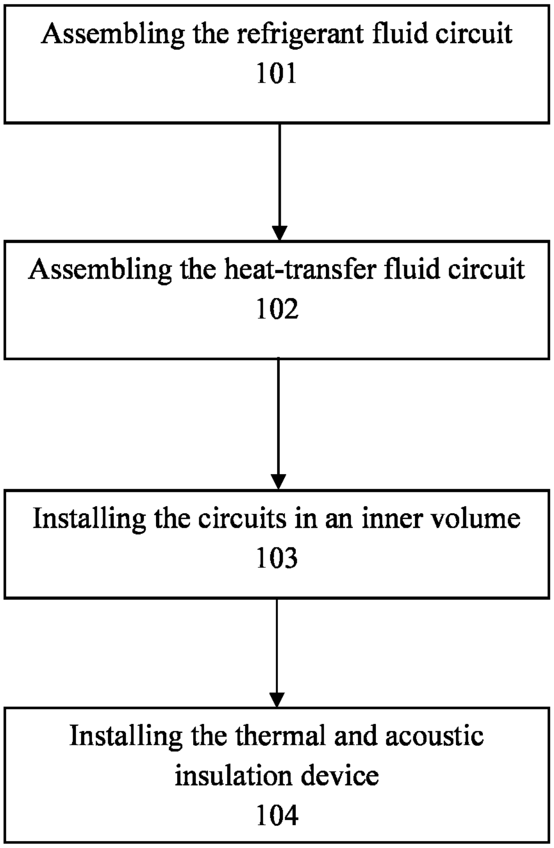
FIG. 7 shows a method for assembly of the heat-producing unit.

As shown in FIG. 7, the method for assembly of a heat-producing unit 6 as described above comprises at least a step 101 of assembly of the refrigerant fluid circuit 12, a step 102 of assembly of the heat-transfer fluid circuit 10, and a step of installation 104 of the thermal and acoustic insulation device 20 at least around components of the refrigerant fluid circuit 12.

During the step of assembly 101 of the refrigerant fluid circuit 12, the expansion unit 26, the compression unit 22 and the heat exchangers 24, 28 are installed and connected to one another by the high-pressure duct 30 and the low-pressure duct 32. The refrigerant fluid is loaded into the refrigerant fluid circuit, thus forming a closed loop. In addition, again during the step of assembly 101 of the refrigerant fluid circuit 12, the inner heat exchanger is also assembled on the refrigerant fluid circuit 12.

Similarly, during the step of assembly 102 of the heat-transfer fluid circuit 10, the heating duct 46 is installed such that the first portion 50 connects the fluid interface 14 fluidically to the second passage 36 of the first heat exchanger 24, and the second portion 52 connects the second passage 36 of the first heat exchanger 24 fluidically to the fluid interface 14. Again during the step of assembly 102 of the heat-transfer fluid circuit 10, the cooling duct 48 is installed such that the first part connects the fluid interface 14 fluidically to the second channel 40 of the second heat exchanger 28, and the second part 56 connects the second channel 40 of the second heat exchanger 28 fluidically to the fluid interface 14.

Advantageously, the step of assembly 101 of the refrigerant fluid circuit 12 and the step of assembly 102 of the heat-transfer fluid circuit 10 can be carried out simultaneously. In fact, certain components of one of the circuits 10, 12 are imbricated for example around components of the other circuit, which makes it necessary to assemble the refrigerant fluid circuit 12 and the heat-transfer fluid circuit 10 simultaneously. However, a method for assembly of the heat-producing unit 6 during which the step of assembly 101 of the refrigerant fluid circuit 12 is carried out before or after the step of assembly 102 of the heat-transfer fluid circuit 10 would not depart from the context of the invention.

In addition, during the step of assembly 102 of the heat-transfer fluid circuit 10, the heat-transfer fluid circuit 10 is connected fluidically to the fluid interface 14 of the heat-producing unit 6.

In addition, the electrical network 60, the electrical interface 58 and the pressure sensor 62 are also assembled on the refrigerant fluid circuit 12 and on the heat-transfer fluid circuit 10 during the step of assembly 101 of the refrigerant fluid circuit 12 and/or during the step of assembly 102 of the heat-transfer fluid circuit 10.

As illustrated in FIG. 4, the method additionally comprises a step of installation 103 of the refrigerant fluid circuit 12 and the heat-transfer fluid circuit 10 in an inner volume 66 which is delimited at least partly by an envelope 64, with the thermal and acoustic insulation device 20 being poured into the inner volume 66. This step of installation 103 of the refrigerant fluid circuit 12 and the heat-transfer fluid circuit 10 is carried out a posteriori steps of assembly of the refrigerant fluid circuit 12 and assembly of the heat-transfer fluid circuit 10.

After the step of installation 103 of the refrigerant fluid circuit 12 and the heat-transfer fluid circuit 10 in the inner volume 66 of the envelope 64, the thermal and acoustic insulation device 20 is installed in the step of installation 104 of the thermal and acoustic insulation device 20, for example poured into the envelope 64, such as to envelop the components of the heat-producing unit 6, once this thermal and acoustic insulation device 20 has solidified.

In addition, the method comprises a step of installation of the securing device 68 in the inner volume 66 of the envelope 64, this step of installation of the securing device 68 being carried out before the step of installation of the thermal and acoustic insulation device 20 in the inner volume 66 of the envelope 64. In addition, the securing device 68 is installed in the inner volume 66 of the envelope 64, such that at least one portion of the wall 76 which is integral with the insulating cylinder 74 is positioned in the inner volume 66 of the envelope 64, and the base 70 is installed on the exterior of the inner volume 66 of the envelope 64.

According to the invention, during the step of installation 104 of the thermal and acoustic insulation device 20, the fluid interface 14 is positioned such that at least one of its faces remains accessible from the exterior of the heat-producing unit 6. Also during the step of installation 104 of the thermal and acoustic insulation device 20, the electrical interface 58 is positioned such that at least one of its faces remains accessible from the exterior of the heat-producing unit 6. The particular arrangements of these interfaces make it possible to be able to make the fluid and electrical interfaces accessible after the installation of the thermal and acoustic insulation device 20.

As an alternative to pouring the thermal and acoustic insulation device 20, the method comprises a step of installation of the two half-shells around the components of the refrigerant fluid circuit 12 and the heat-transfer fluid circuit 10, such as to form an assembly which bears components of these circuits. This assembly can thus be positioned either in the envelope 64, or in a cavity formed in the chassis of the vehicle.

A description in greater detail will now be provided of the method for installation of the heat-producing unit 6 on the vehicle 1, in particular with reference to FIG. 5.

The installation method comprises at least one step of securing of the securing devices on the chassis 2. During this securing step, the base 70 of the securing device 68 is installed on the chassis 2 of the vehicle 1, and the attachment means are used to render the securing device 68 integral with the chassis 2 of the vehicle 1.

According to an alternative, the installation method comprises at least one step of arrangement of the components of the refrigerant fluid circuit and the heat-transfer fluid circuit in a cavity which is delimited at least partly by the chassis 2, and a step of pouring of the thermal and acoustic insulation device 20 such that it extends between at least one component of the refrigerant fluid circuit 12, and one wall of the chassis 2 which delimits the cavity. It is understood that the refrigerant fluid circuit 12 and at least the heat-transfer fluid circuit 10 are installed in the cavity after having been assembled, and that the thermal and acoustic insulation device 20 is then poured into the cavity in order to render the refrigerant fluid circuit 12 and the heat-transfer fluid circuit 10 integral with the chassis 2 of the vehicle 1.

The present invention is not however limited to the means and configurations described and illustrated in the present document, and also extends to all equivalent means and configuration and to any technically operational combination of such means.

What is claimed is:

1. A heat-producing unit for a vehicle, the heat-producing unit configured to thermally treat a heat-transfer fluid and comprising:

at least one refrigerant fluid circuit which is designed so that the refrigerant can circulate therein, and including components comprising at least one compressor unit for compression of the refrigerant fluid, at least one heat exchanger which is configured to exchange calories between the refrigerant fluid and the heat-transfer fluid, and ducts connecting the components, an envelope forming a housing of the heat-producing unit, the envelope delimiting an inner volume containing the components of the refrigerant fluid circuit and the ducts;

wherein the heat-producing unit further comprises at least one fluid interface mounted to a wall of the envelope and which is designed to connect the at least one refrigerant fluid circuit to an installation outside the heat-producing unit, the heat-producing unit further comprising a thermal and acoustic insulation device that fills the inner volume between an inner face of the envelope and the components of the refrigerant fluid circuit and matches the form of the components such that the components are mechanically retained by the thermal and acoustic insulation device maintaining the position of the components of the refrigerant fluid circuit within the heat-producing unit.

2. The heat-producing unit as claimed in claim 1, wherein the thermal and acoustic insulation device includes a first half-shell and a second half-shell which cooperate with one another in order to delimit receptacles in which the components of the at least one refrigerant fluid circuit and the heat-transfer fluid circuit extend.

3. The heat-producing unit as claimed in claim 1, further comprising at least one securing device for securing of the heat-producing unit, designed to secure the heat-producing unit on a chassis of a vehicle.

4. The heat-producing unit as claimed in claim 3, wherein the at least one securing device includes a base with a rod projecting from the base as well as an insulating cylinder installed around the rod, with the at least one securing device including a wall which is integral with the insulating cylinder and the thermal and acoustic insulation device.

5. The heat-producing unit as claimed in claim 3, wherein the at least one securing device extends in the inner volume, with the thermal and acoustic insulation device maintaining the position of the at least one securing device within the inner volume.

6. The heat-producing unit as claimed in claim 1, further comprising a first heat exchanger, wherein the at least one heat exchanger is a second heat exchanger, wherein at least one of the first and the second heat exchangers is installed on the exterior of the thermal and acoustic insulation device.

7. The heat-producing unit as claimed in claim 6, wherein the first heat exchanger is used as a gas condenser or cooler, with the second heat exchanger being used as an evaporator.

8. The heat-producing unit as claimed in claim 7, further comprising at least one fluid heat exchanger connection interface between the at least one refrigerant fluid circuit and the first heat exchanger installed on the exterior of the thermal and acoustic insulation device.

9. A vehicle comprising at least one heat-producing unit configured to thermally treat a heat-transfer fluid, including at least one heat-transfer fluid circuit which is designed to have a heat-transfer fluid passing there through, a refrigerant fluid circuit which is designed so that the refrigerant can circulate therein and including components comprising at least one compressor unit for compression of the refrigerant fluid, at least one heat exchanger which is configured to exchange calories between the refrigerant fluid and the heat transfer fluid, and ducts connecting the components, an envelope forming a housing of the heat-producing unit, the envelope delimiting an inner volume containing the components of the refrigerant fluid circuit and the ducts;

wherein the at least one heat-producing unit further includes at least one fluid interface mounted to a wall of the envelope and which is designed to connect the at least one heat-transfer fluid circuit to an installation outside the at least one heat-producing unit, the heat-producing unit further including a thermal and acoustic insulation device that fills the inner volume between an inner face of the envelope and the components of the refrigerant fluid circuit and matches the form of the components of the refrigerant fluid circuit such that the components are mechanically retained by the thermal and acoustic insulation device within the at least one heat-producing unit, an external installation through which the heat-transfer fluid passes, and a chassis, the external installation being connected to the at least one heat-transfer fluid circuit by means of the at least one fluid interface, and at least one heat-producing unit being secured to the chassis by means of the at least one securing device.

10. The vehicle as claimed in claim 9, wherein the chassis participates at least partly in delimiting a cavity in which the at least one heat-producing unit is installed, with the thermal and acoustic installation device extending at least between one of the components of the refrigerant fluid circuit and the chassis.

11. The vehicle as claimed in claim 9, wherein the heat producing unit further comprises at least one securing device designed to secure the heat-producing unit on a chassis of a vehicle, the at least one securing device including a base and a rod projecting from the base.

12. The vehicle as claimed in claim 11, wherein the at least one securing device includes an insulating cylinder installed around the rod.

13. The vehicle as claimed in claim 12, wherein the at least one securing device includes a wall which is integral with both the insulating cylinder and the thermal and acoustic insulation device.

14. A heat-producing unit for a vehicle, the heat-producing unit comprising:

at least one heat-transfer fluid circuit;

a refrigerant fluid circuit including components comprising at least one compressor unit, at least one heat exchanger and ducts connecting the components;

a thermal and acoustic insulation device which extends at least partly around at least one of the components of the refrigerant fluid circuit;

wherein the heat-producing unit further comprises at least one securing device designed to secure the heat-producing unit on a chassis of a vehicle, the at least one securing device including a base and a rod projecting from the base;

wherein the heat-producing unit comprises an envelope at least partly delimiting an inner volume which receives the components of the refrigerant fluid circuit and the heat-transfer fluid circuit, and the at least one securing device engages with a wall of the envelope.

15. The heat-producing unit as claimed in claim 14, wherein the thermal and acoustic insulation device extends at least partly around the at least one heat-transfer fluid circuit such that the at least one heat-transfer fluid circuit is mechanically retained within the heat-producing unit.

16. The heat-producing unit as claimed in claim 14, wherein the thermal and acoustic insulation device includes a first half-shell and a second half-shell which cooperate with one another in order to delimit receptacles in which the components of the refrigerant fluid circuit and the at least one heat-transfer fluid circuit extend.

17. The heat-producing unit as claimed in claim 14, wherein the chassis participates at least partly in delimiting a cavity in which the heat-producing unit is installed, with the thermal and acoustic installation device extending at least between one of the components of the refrigerant fluid circuit and the chassis.

18. The heat-producing unit as claimed in claim 14, wherein the at least one securing device includes an insulating cylinder installed around the rod.

19. The heat-producing unit as claimed in claim 18, wherein the at least one securing device includes a wall which is integral with both the insulating cylinder and the thermal and acoustic insulation device.

* * * * *